United States Patent
Waquet

[15] 3,682,127
[45] Aug. 8, 1972

[54] AMPHIBIOUS VEHICLE WITH ROTATING FLOATS

[72] Inventor: Bernard Edmond Louis Marie Waquet, Paris, France

[22] Filed: Sept. 9, 1970

[21] Appl. No.: 70,791

[30] Foreign Application Priority Data

July 21, 1970 France.....................7027663
Sept. 11, 1969 France.....................6930960

[52] U.S. Cl. ...............................................115/19
[51] Int. Cl. ............................B63h 1/38, B63h /00
[58] Field of Search.................................115/19, 1

[56] References Cited

UNITED STATES PATENTS 836,821  11/1906  Nelson....................115/1 R
3,250,239  5/1966  Garate....................115/1 R
3,397,668  8/1968  Mainguy..................115/1 R Primary Examiner—Andrew H. Farrell
Attorney—Bryan, Parmelee, Johnson & Bollinger

[57] ABSTRACT

In general terms, the invention relates to a vehicle with rotating floats for traveling at high speed on water, having a shallow draught, high longitudinal and lateral stability and, in addition, being capable of maneuvering on soft or solid ground.

6 Claims, 8 Drawing Figures

INVENTOR
Bernard Edmond Waquet
BY

Bryan Parmelee, Johnson & Bollinger
ATTORNEYS

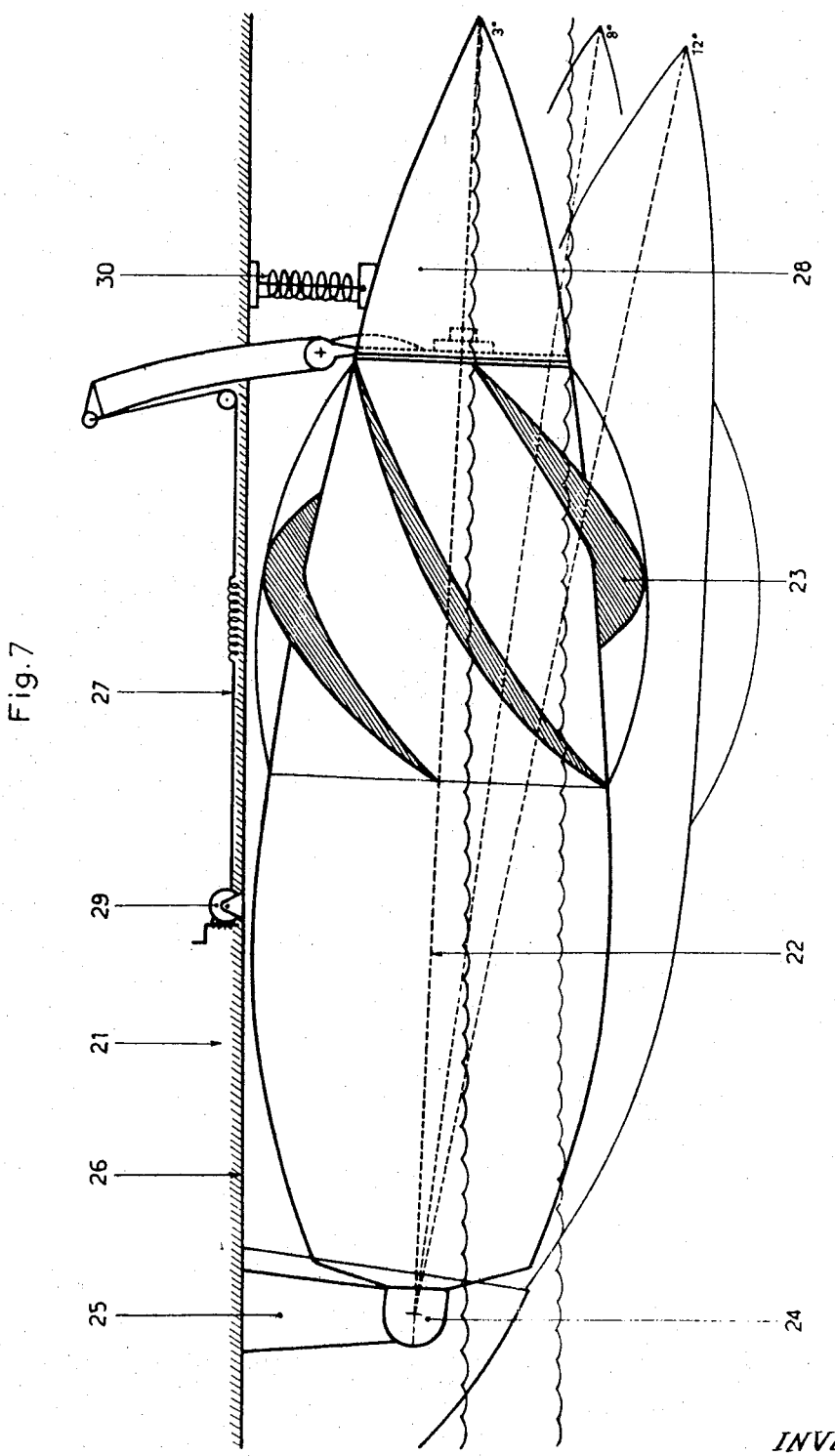

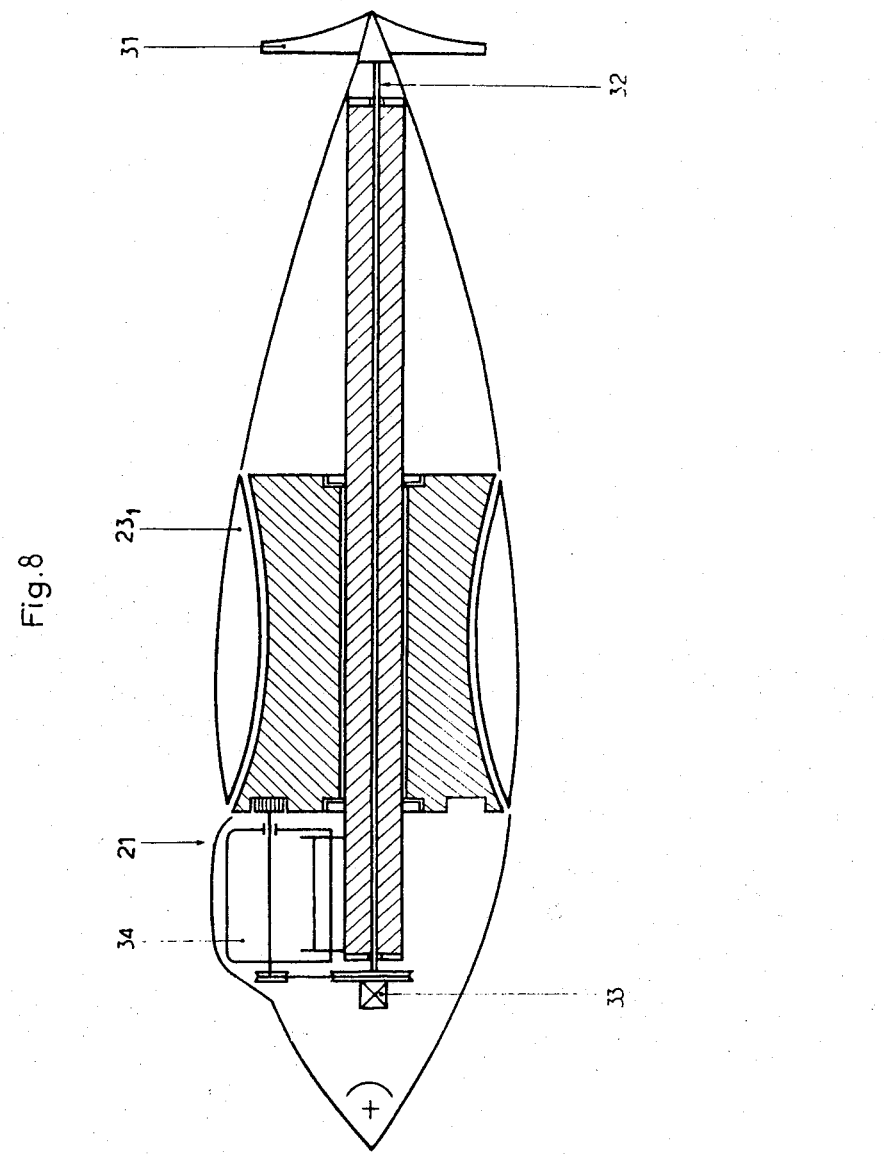

AMPHIBIOUS VEHICLE WITH ROTATING FLOATS

The idea of equipping an amphibious vehicle with rotating floats is very old; by surrounding these floats with a spiral or giving them a helicoidal shape, they are made to play the role of a propeller. In water, forward motion is effected parallel to the axis of the floats; on solid or muddy ground, it is effected at right angles to this axis.

Previous vehicles most often have two or four rotors mounted on a floatable hull. On a vehicle with four rotors, they are positioned in pairs on either side of the hull, each pair turning on one and the same axis.

The stability and actual performances of vehicles constructed in this way are poor, impeding their development.

This invention consequently aims at producing a vehicle with the following characteristics:
capacity to exceed 15 knots on water;
capacity to maneuver on soft or solid ground and to climb a slope of about 20°;
longitudinal and lateral stability in choppy water;
maneuverability at all speeds on water and on land.

The invention aims mainly at production of small tonnage vehicles.

Depending on the commercial load, the vehicle will have four, six or eight rotating floats, more if need be.

In accordance with the intended purpose of the vehicle, the central rotating part of a float will represent about 30 percent of the length of the float for a large model and about 70 percent for a smaller model such as a sports model.

To this aim, the invention relates to an amphibious vehicle with propelling, rotating floats for traveling at high speed on water and able to move on soft or solid ground, with the rotating floats supporting a platform not intended to rest on the water, vehicle characterized by the fact that it comprises at least four rotating floats, each one inclined at an appropriate positive trim angle in relation to the water.

Other characteristics of the invention will be seen from the description, claims, and accompanying drawings in which:

FIG. 7 is a schematic view of a method of producing the variable trim mechanism for a rotating float;

FIG. 8 is a schematic longitudinal section of a float whose rotating part represents only 30 percent of the total length and whose rear end bears a high-efficiency marine propeller.

Figure 1:
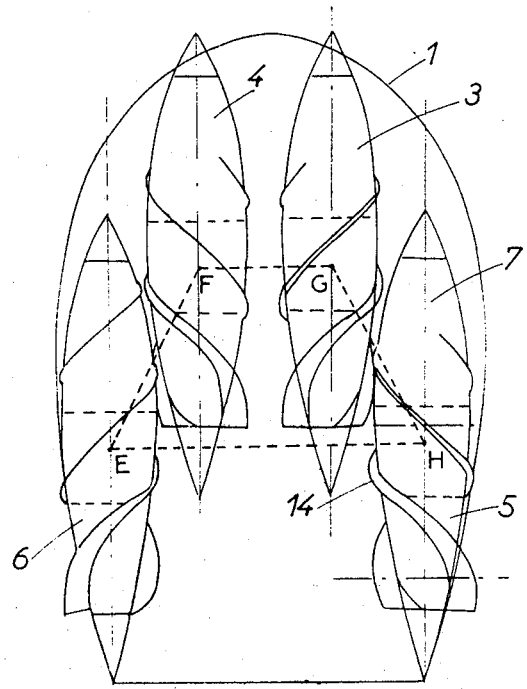
FIG. 1 is a schematic view of the small-sized vehicle with four floats, seen from below.

The chassis 1 receives a body 2 inside which a motor or group of motors can transmit their power to propelling floats 3, 4, 5 and 6 by mechanical, electric or hydraulic means.

In this first embodiment, the vehicle has four propelling floats distributed in two pairs, one pair positioned center front, comprising floats 3 and 4, and a lateral rear pair comprising floats 5 and 6.

Each propelling float's axis of rotation 7 is situated in a vertical plane parallel to the boat's axis of progression when it moves on water.

Figure 4:
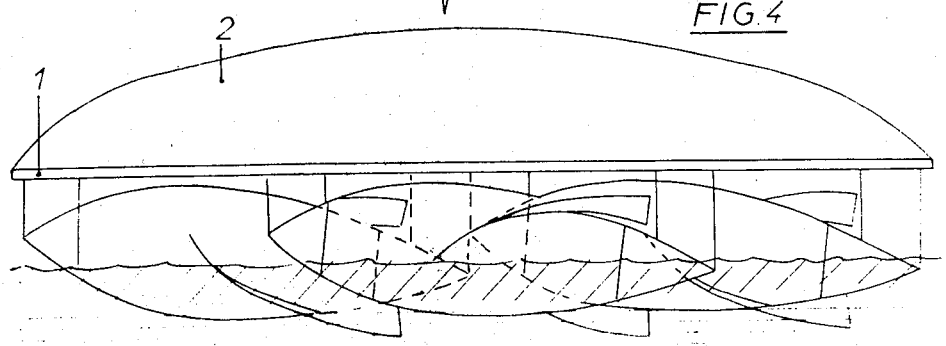
FIG. 4 is a side view of the vehicle illustrated in FIG. 3.
Figure 6:
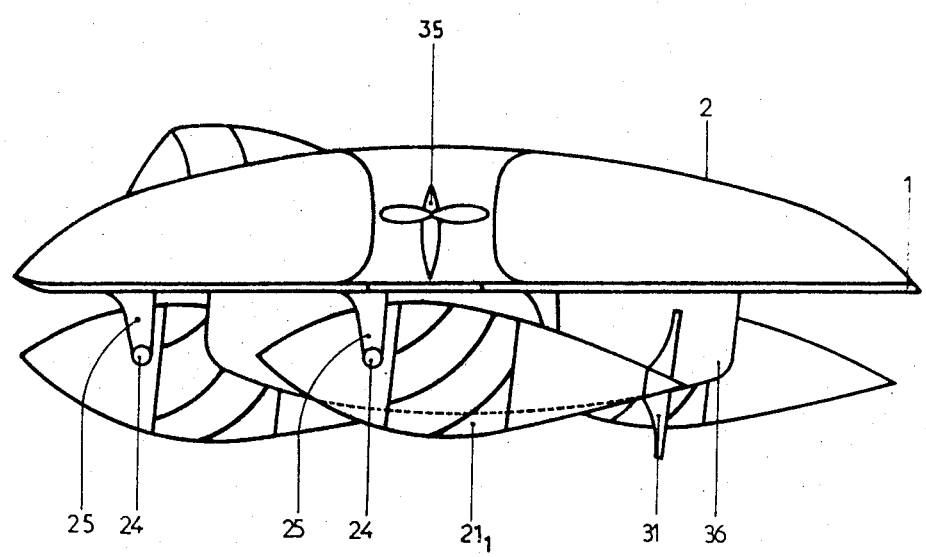
FIG. 6 is a side view of the vehicle illustrated in FIG. 5, showing the variable trim of each rotating float.

As can be seen from FIGS. 4, 6 and 7, each rotating float has a positive trim angle in relation to the water; this angle may, in addition, be variable and may be controlled from the vehicle's cockpit.

Figure 2:
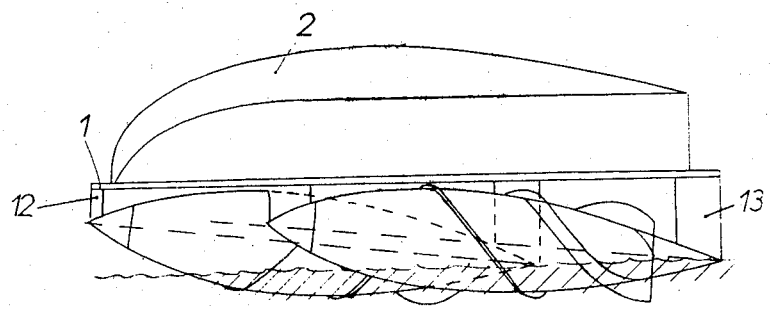
FIG. 2 is a side view of the vehicle illustrated in FIG. 1.

In the embodiment shown in FIGS. 1 and 2, the floats are connected to the chassis 1 by means of struts 12 and 13 positioned at the front and rear of the floats.

The front strut 12 is preferably shorter than the rear strut 13 so as to give the float axis a positive angle of trim in relation to the water-line.

In normal use, the angle of trim of the floats is between 1° and 20°.

Figure 3:
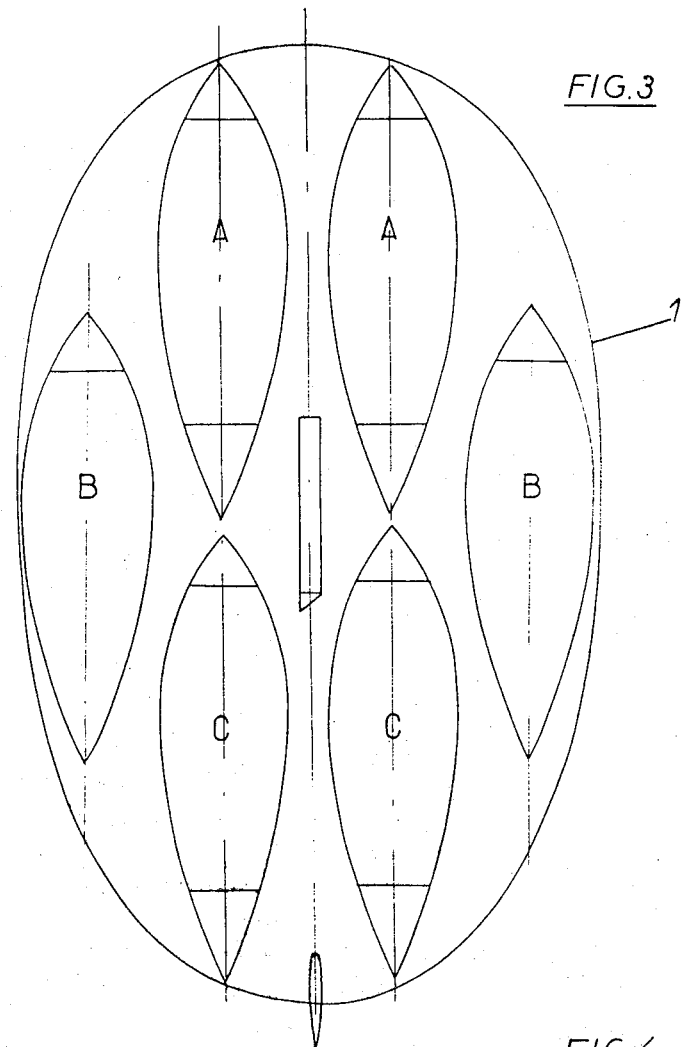
FIG. 3 is a view of a heavier vehicle with six propelling floats, seen from below.

In the embodiment shown in FIGS. 3 and 4, the floats are divided into groups forming three stabilizing elements A, B, C, i.e. a forward unit A, a lateral unit B, and a rear unit C.

Figure 5:
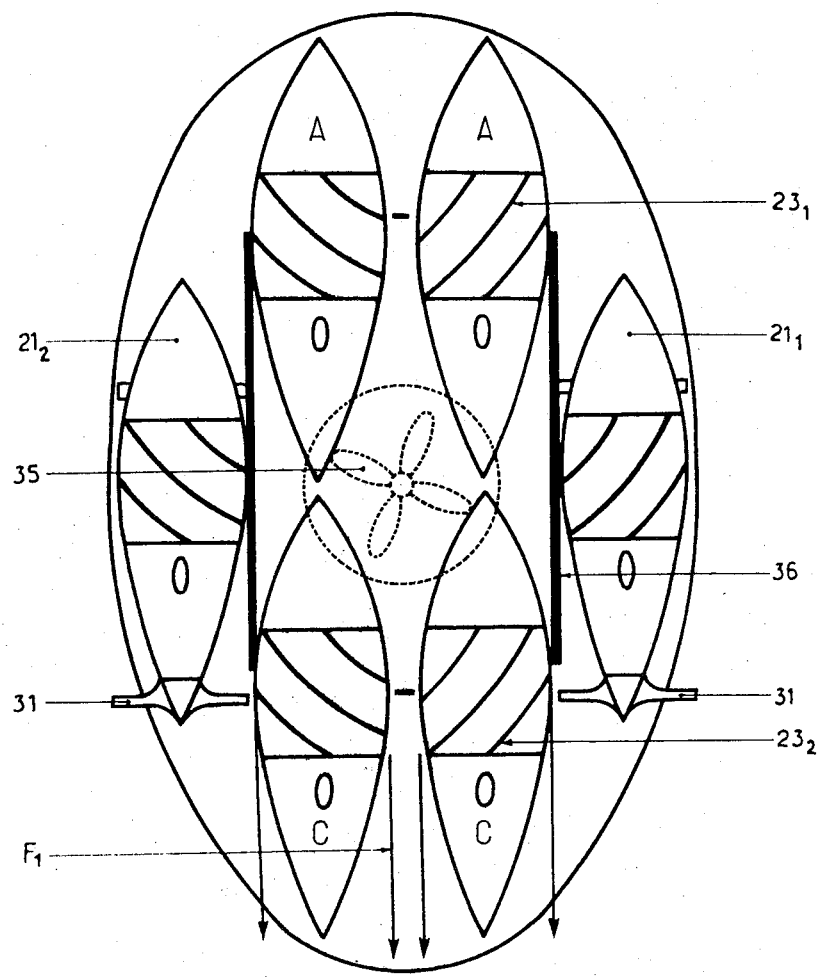
FIG. 5 is a schematic view of the vehicle illustrated in FIG. 3, seen from below, showing an auxiliary device for propulsion by high-efficiency marine propellers and a stream of supporting and propelling air.

These three stabilizing elements also appear in the embodiment shown in FIGS. 5 and 6, representing a vehicle with six rotating floats; this vehicle is fitted, as before, with floats whose trim is permanently adjustable and variable by an adjustment operation and spring suspension which will be described later.

In the embodiment shown in FIGS. 1 and 2, longitudinal and lateral stability is obtained with the aid of only two pairs of floats, whose centers E, F, G, H form the four corners of a trapezium, the pair of floats 3 and 4 positioned at the front forming the forward stabilizing unit, the other pair 5 and 6 forming both the rear and lateral stabilizing unit.

To achieve high performances, the boat may comprise auxiliary means of propulsion. These means include firstly the high-efficiency immersable propellers 31 fixed on certain of the vehicle's floats, more particularly at the rear of lateral floats $21_1$ and $22_2$.

These lateral floats rotate in the opposite direction to each other, so as to assist the lateral stability of the vehicle.

Auxiliary propulsion is also obtained with the aid of a stream of air admitted via a turbo-fan 35 in the center of the group A and C of four central floats.

The stream of air is retained at the front of the vehicle by the propelling helicoids $23_1$ on the forward floats.

The stream of air is retained on the sides by fixed or folding solid walls 36, and at the rear by the rear float helicoids $23_2$; the stream of air is pulsed to the rear of the boat in the direction $F_1$ by means of propelling helicoids $23_2$ on the rear floats.

In the embodiment illustrated in FIG. 7, a rotating propelling float is shown by general reference 21.

This float has the general shape of a stream-lined body rotated around an axis 22, the stream-lined body having spiral-shaped moldings fitted along part of its length, and terminating either in a tapering leak 28 or, to reduce drag at high speeds, a flat end like the rear of a planing hull.

According to one characteristic of the invention, the angle of trim of the float is adjustable but, in addition, it may vary constantly depending on the surface of the waves.

To this aim, the float 21 may pivot around its fixing point 24 on the supporting strut 25 connected to the boat's platform chassis 26.

The angle of trim is adjusted, for example, by a cable control 27 linked to both the rear part 28 of the float and to a manually-operated or remote control winch.

This device for adjusting the angle of trim of the floats gives an average value of trim selected as a function of the vehicle's load and speed.

In order to increase the efficiency of propulsion, the float angle of trim may vary around the selected value so that the float follows the crest of the waves.

To this aim, the rear part of the float is attached to the chassis 26 of the vehicle by means of a spring suspension unit 30.

It should be noted that the float's spring suspension device is also used when the vehicle travels on land.

In FIG. 8, the auxiliary means of propulsion 21 is formed by a high-efficiency immersable propeller 31, possibly with variable pitch, mounted behind a rotating float.

This propeller 31 is such that it can be driven by a driving shaft 32 positioned on the axis of the rotating float, this driving shaft being actuated through a remote control clutch 33 by the motor 34 driving the main propelling part $23_1$ of the float.

Immersion of the high-efficiency auxiliary propeller is effected by adjusting the angle of trim of the float by means of the above-described or similar mechanism.

What is claimed is:

1. An amphibious vehicle with propelling, rotating floats for traveling at high speed on water and able to move on soft or solid ground, with the floats supporting a platform not intended to rest on the water, vehicle characterized by the fact that it comprises at least four rotating floats, each one inclined at an appropriate positive trim angle in relation to the water.

2. A vehicle as defined in claim 1, in which the appropriate positive trim angle of each float is variable.

3. A vehicle as defined in claim 1, in which the rotating floats are divided into groups forming three stabilizing elements, a forward unit, a lateral unit, and a rear unit.

4. A vehicle as defined in claim 1, in which there are only two pairs of floats, whose centers form the four corners of a trapezium, the pair of floats positioned at the front forming the forward stabilizing unit, the other pair forming both the rear and lateral stabilizing unit.

5. A vehicle as defined in any one of claim 1, in which a high-efficiency marine propeller is installed at the rear of certain floats.

6. A vehicle as defined in any one of claim 1, which comprises a supporting and propelling air-cushion device connected to rotating floats in such a way that the stream of air is retained at the front and rear by rotating floats and at the sides by solid lateral walls.

* * * * *